(12) United States Patent
Mohtadi et al.

(10) Patent No.: US 9,455,473 B1
(45) Date of Patent: Sep. 27, 2016

(54) IONIC LIQUIDS FOR RECHARGEABLE MAGNESIUM BATTERY

(71) Applicant: Toyota Motor Engineering & Manufacturing North America, Inc., Erlanger, KY (US)

(72) Inventors: Rana Mohtadi, Northville, MI (US); Oscar Tutusaus, Ann Arbor, MI (US); Fuminori Mizuno, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/883,556

(22) Filed: Oct. 14, 2015

Related U.S. Application Data (60) Provisional application No. 62/160,405, filed on May 12, 2015.

(51) Int. Cl.
*H01M 10/0567* (2010.01)
*H01M 10/054* (2010.01)
*H01M 10/0566* (2010.01)

(52) U.S. Cl.
CPC ....... *H01M 10/0566* (2013.01); *H01M 10/054* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 2013/0034780 A1* | 2/2013 | Muldoon | H01M 4/661 429/339 |
| 2014/0038037 A1 | 2/2014 | Mohtadi et al. | |
| 2014/0038061 A1 | 2/2014 | Mohtadi et al. | |
| 2014/0349178 A1 | 11/2014 | Mohtadi et al. | |
| 2014/0349199 A1 | 11/2014 | Mohtadi et al. | |
| 2015/0311565 A1* | 10/2015 | Muldoon | H01M 10/0568 429/335 |
| 2015/0325881 A1* | 11/2015 | Mohtadi | H01M 10/054 429/341 |

OTHER PUBLICATIONS

"Boron Science, New Technologies and Applications", (2011), CRC Press, N. Hosmane (Ed.), ISBN: 978-1-4398-2662-1.

Carter, T. J. et al., "Boron Clusters as Highly Stable Magnesium-Battery Electrolytes", Angew. Chem. Int. Ed., 2014, pp. 3173-3177, vol. 53.

Guo, Y. et al., "Boron-based electrolyte solutions with wide electrochemical windows for rechargeable magnesium batteries", Energy Environ. Sci., 2012, pp. 9100-9106, vol. 5.

Muldoon, J. et al., "Electrolyte roadblocks to a magnesium rechargeable battery", Energy Environ. Sci., 2012, 5, pp. 5941-5950.

(Continued)

*Primary Examiner* — Lucas J O'Donnell
(74) *Attorney, Agent, or Firm* — Christopher G. Darrow; Darrow Mustafa PC (57) ABSTRACT

An electrolyte composition for a magnesium electrochemical cell includes a magnesium salt dissolved in an ionic liquid. The ionic liquid includes an organic cation and a first boron cluster anion. The magnesium salt has a magnesium cation and a second boron cluster anion. The magnesium electrochemical cell includes an anode that contains elemental magnesium when charged, a cathode suitable for magnesium insertion or deposition, and the aforementioned electrolyte composition that is in ionic communication with the anode, the cathode, or both.

18 Claims, 5 Drawing Sheets

(56) References Cited

OTHER PUBLICATIONS

Nieuwenhuyzen, M. et al., "Ionic Liquids Containing Boron Cluster Anions", Inorg. Chem., (2009), pp. 889-901, v. 48.

Tutusaus, O. et al., "Paving the Way Towards Highly Stable and Practical Electrolytes for Rechargeable Magnesium Batteries", Chem Electro Chem, 2015, pp. 51-57, vol. 2, No. 1.

* cited by examiner

IONIC LIQUIDS FOR RECHARGEABLE MAGNESIUM BATTERY

CROSS-REFERENCE TO RELATED APPLICATION

The present application claims the benefit of U.S. Provisional Application No. 62/160,405, filed May 12, 2015, which is incorporated by reference in its entirety.

TECHNICAL FIELD

The present disclosure relates generally to magnesium batteries and electrolytes for use in magnesium batteries, to ionic liquids, and to boron cluster chemistry.

BACKGROUND

Magnesium batteries offer the potential of good capacity and lower cost in comparison to state-of-art lithium-ion batteries, due to the divalency and relative abundance of magnesium. A challenge in the development of magnesium batteries has been in the development of electrolytes that support reversible magnesium stripping/deposition and that are stable against electrode corrosion within desired electrical potential windows.

Common magnesium salts, as well as polar aprotic solvents, generally do not support reversible magnesium stripping/deposition because they decompose at the magnesium anode surface creating a layer that is impermeable to magnesium ions. Grignard reagents and magnesium organohaloaluminates have been shown to support reversible magnesium stripping/deposition, but are corrosive to non-noble metal cathodic current collectors at electrical potentials greater than about 2.5 V (vs. Mg/Mg$^{2+}$), thus limiting their usefulness. More recently, electrolytes based on magnesium borohydride or magnesium salts of boron cluster anions (including carboranyl anions) have shown the ability to support reversible magnesium stripping/deposition, with high oxidative stability at electrical potentials exceeding 3.5 V (vs. Mg/Mg$^{2+}$) in some cases without inducing corrosion to non-noble metal cathodic current collectors.

Nearly all such electrolytes contain an ether solvent, as ethers are the only solvents known to be compatible with magnesium metal. However ethers typically undergo electrochemical oxidation at about 3.5 V (vs. Mg/Mg$^{2+}$). For this reason, ether solvents can become a limiting factor in the electrochemical stability of an electrolyte composition when utilized in combination with a magnesium salt, such as several mentioned above, that is characterized by high (e.g. greater than 3.0 V vs. Mg/Mg$^{2+}$) electrochemical stability.

SUMMARY

An electrolyte suitable for use in a magnesium electrochemical cell is provided. A magnesium electrochemical cell that includes the electrolyte composition is also provided.

In one aspect, an electrolyte composition for use in a magnesium battery is disclosed. The electrolyte composition includes an ionic liquid of the formula $G_pA$, wherein G is an organic cation, p is 1 or 2; and A is a first boron cluster anion. The electrolyte composition further includes a magnesium salt of the formula $MgE_yA'_q$ wherein Mg is a magnesium cation, E is a solvent molecule coordinated to the magnesium cation, y is an integer within a range of 0 to 6, A' is a second boron cluster anion, and q is 1 or 2.

In some implementations, the first boron cluster anion is, the second boron cluster anion is, or both the first and second boron cluster anions are, independently, defined by any of the following anion formulae: $[B_yH_{(y-z-i)}R_zX_i]^{2-}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$ or $[C_2B_{(y-3)}H_{(y-t-j-1)}R_tX_j]^{2-}$. In the aforementioned anion formulae, y is an integer within a range of 6 to 12; (z+i) is an integer within a range of 0 to y; (t+j) is an integer within a range of 0 to (y−1); and X is F, Cl, Br, I, or a combination thereof. In some variations of the aforementioned anion formulae, R is any of: a linear, branched-chain, or cyclic C1-C18 alkyl or fluoroalkyl (fully or partially fluorinated alkyl group); a C6-C14 aryl or fluoroaryl (fully or partially fluorinated aryl group); an alkoxy group; an aryloxy group; and a combination thereof.

In another aspect, a magnesium electrochemical cell is disclosed. The magnesium electrochemical cell includes a magnesium anode, a cathode, and an electrolyte composition as described above.

These and other features of the method for forming an ionic liquid and the electrochemical cell having the same will become apparent from the following detailed description when read in conjunction with the figures and examples, which are intended to be illustrative and not exclusive.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

The present disclosure provides electrolyte compositions, as well as electrochemical cells having the electrolyte composition. The electrolyte compositions include an ionic liquid, which generally includes an organic cation and a borane cluster anion. The electrolyte compositions further include a magnesium salt of a boron cluster anion, the magnesium cation being the electrochemically active species of the electrolyte. In some implementations, the organic cation is any of a functionalized imidazolium, ammonium, pyrrolidinium, piperidinium, and phosphonium cation.

The electrolyte compositions of the present teachings have good magnesium conductivity, support reversible magnesium stripping/deposition, and are fluid at temperatures as low as 100° C. Because they do not require an ether solvent (although they can contain relatively small amounts of ether coordinated to magnesium cations), the disclosed electrolyte compositions have virtually no volatility or flammability, improving battery safety, and are resistant to electrochemical oxidation at electrical potentials in excess of 3 V (vs. Mg/Mg$^{2+}$).

Accordingly, provided herein is an electrolyte composition for use in a magnesium battery. The electrolyte composition includes an ionic liquid having a formula $G_pA$, where G is an organic cation, A is a first boron cluster anion, and p is either one or two. In some implementations, the organic cation can include any of an imidazolium, ammonium, pyrrolidinium, piperidinium, pyridinium, sulfonium, and phosphonium cation, shown in Structures 1-5, respectively.

Structure 1

Structure 2

Structure 3

Structure 4

Structure 5

Structure 6

Structure 7 where R and, where present, R', R" and R'" is each, independently, an organic substituent belonging to any of: group (i) a linear, branched-chain, or cyclic C1-C18 alkyl or fluoroalkyl group; group (ii) a C6-C14 aryl or fluoroaryl group; group (iii) a linear, branched-chain, or cyclic C1-C18 alkoxy or fluoroalkoxy group; group (iv) a C6-C14 aryloxy or fluoroaryloxy group, and group (v) a substituent that includes two or more moieties as defined by any two or more of groups (i)-(iv). Non-limiting examples of group (v) substituents include a benzyl, methoxyethyl, or trifluoromethoxyethyl group.

Non-limiting examples of suitable alkyl groups include methyl, ethyl, propyl, isopropyl, butyl, tert-butyl, cyclohexyl, and any other linear, branched-chain, or cyclic C1-C18 alkyl group. Non-limiting examples of suitable aryl groups include phenyl, naphthyl, and anthracenyl. An alkoxy group or an aryloxy group is one having a formula —OR where R is alkyl or aryl, respectively. The expressions "fluoroalkyl", "fluoroaryl", "fluoroalkoxy", and "fluoroaryloxy" refer to an alkyl, aryl, alkoxy, or aryloxy group, respectively, in which at least one C—H bond is replaced with a C—F bond.

It is to be understood that when p equals two, the two organic cations contained in the stoichiometric unit of the ionic liquid can be the same cation or can be two different cations.

As used herein, the phrase "boron cluster anion" generally refers to an anionic form of any of the following: a borane having 6-12 boron atoms with a net −2 charge; a carborane having 1 carbon atom and 5-11 boron atoms in the cluster structure with a net −1 charge; a carborane having 2 carbon atoms and 4-10 boron atoms in the cluster structure with a net −1 or −2 charge. In some variations, a boron cluster anion can be unsubstituted, having only hydrogen atoms in addition to the aforementioned. In some variations, a boron cluster anion can be substituted, having: one or more halogens replacing one or more hydrogen atoms; one or more organic substituents replacing one or more hydrogen atoms; or a combination thereof.

In some implementations, the first boron cluster anion can be an anion having any formula of:

Anion Formula I,

Anion Formula II,

Anion Formula III,

Anion Formula IV, or

Anion Formula V, wherein y is an integer within a range of 6 to 12; (z+i) is an integer within a range of 0 to y; (t+j) is an integer within a range of 0 to (y−1); and X is F, Cl, Br, I, or a combination thereof. Substituent R as included in Anion Formulae I-IV can be any organic substituent as defined by the types (i)-(v) that can be included in the organic cation.

It is to be understood that when z or t is greater than one (i.e. when a plurality of R groups is present in the boron cluster anion), the plurality of R groups can include individual substituents selected from a plurality of groups (i)-(v). This can alternatively be stated as follows: when R of any of Anion Formulae I-V defines a plurality of substituents, the plurality of substituents can comprise a plurality of groups (i)-(v). For example, a boron cluster anion can simultaneously include both an alkyl group and a partially fluorinated aryloxy group.

Similarly, where it is noted above that X can be F, Cl, Br, I, or a combination thereof, this indicates that when i is an integer within a range of 2 to y, or j is an integer within a range of 2 to (y−1), this indicates that a plurality of halogen substituents is present. In such a situation, the plurality of halogen substituents can include F, Cl, Br, I, or any combination thereof. For example, a boron cluster anion having three halogen substituents (i.e. where i or j equals 3), the three halogen substituents could be three fluorine substituents; 1 chlorine substituent, 1 bromine substituent, and 1 iodine substituent; or any other combination.

In different implementations, the boron cluster anion can include any of a substituted or unsubstituted closo- and nido-boron cluster anion. In some implementations, the boron cluster anion will be a closo-boron cluster anion, such as closo-$[B_6H_6]^{2-}$, closo-$[B_{12}H_{12}]^{2-}$, closo-$[CB_{11}H_{12}]^-$, or closo-$[C_2B_{10}H_{12}]^-$. In some implementations, the boron cluster anion will be a nido-boron cluster anion, such as nido-$[C_2B_9H_{12}]^-$.

Figure 1A:
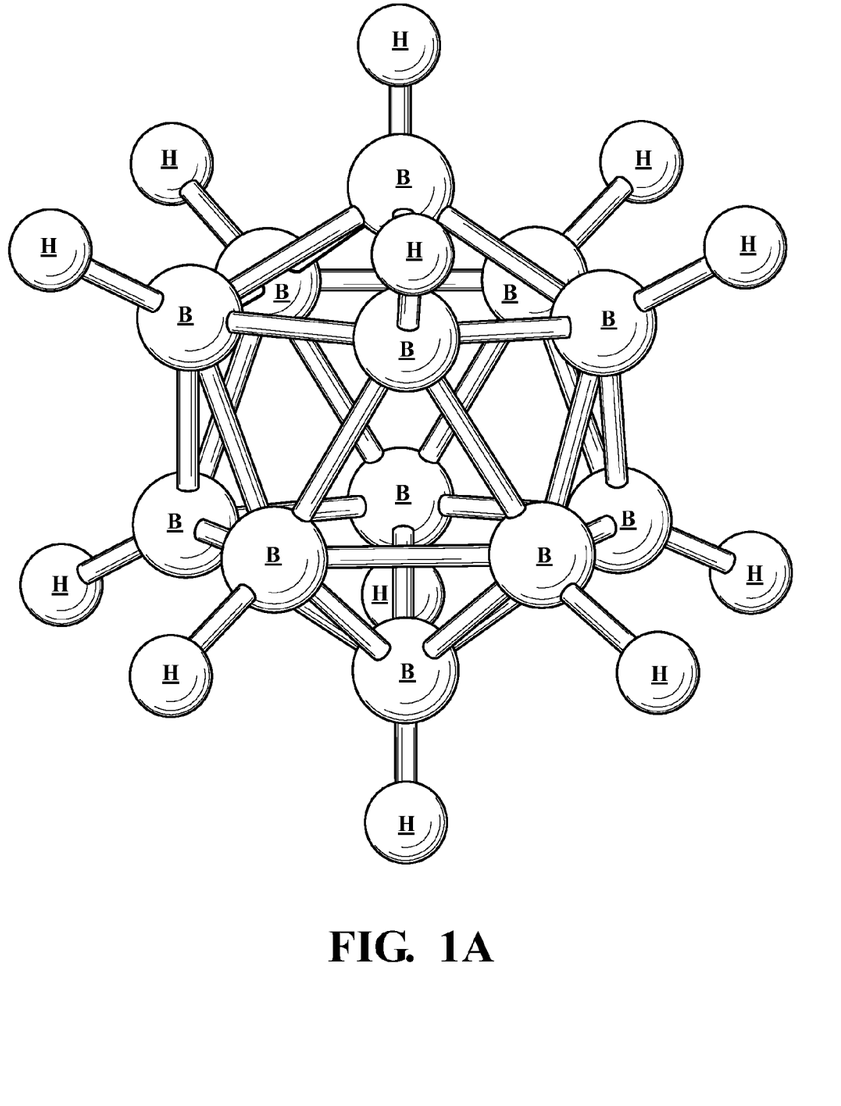
FIG. 1A is a perspective schematic view of a representative boron cluster anion of the present disclosure, closo-$[B_{12}H_{12}]^{2-}$.
Figure 1B:
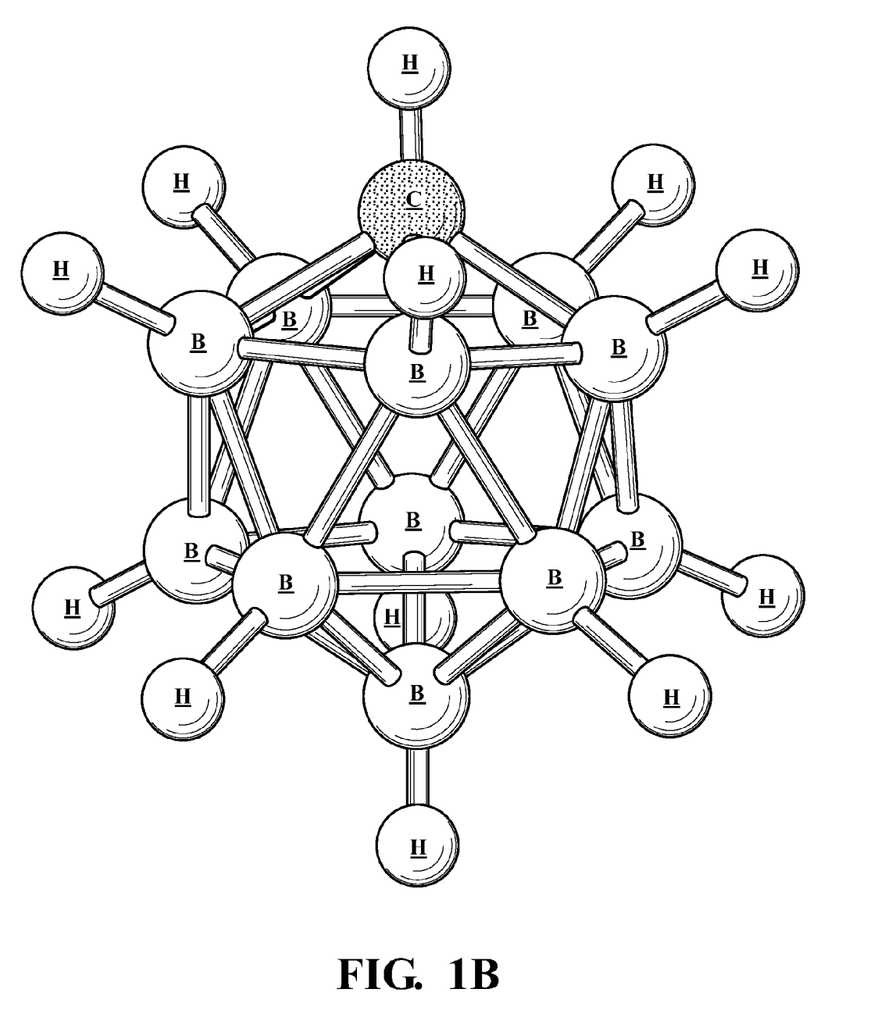
FIG. 1B is a perspective schematic view of a boron cluster anion of the present disclosure, closo-$[CB_{11}H_{12}]^-$.
Figure 1C:
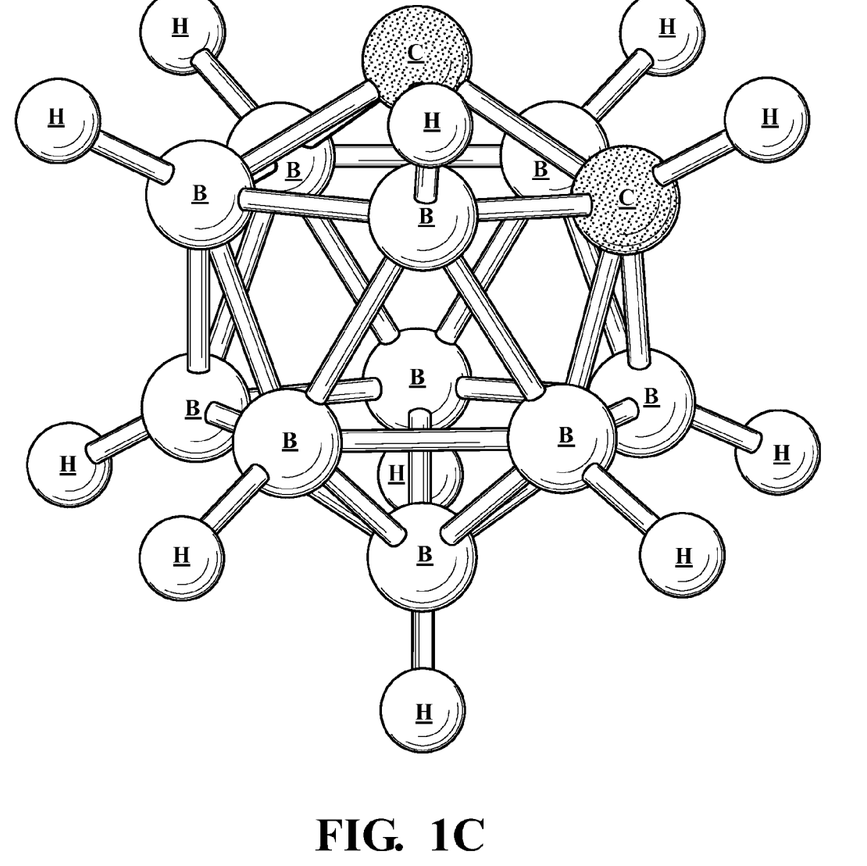
FIG. 1C is a perspective schematic view of a boron cluster anion of the present disclosure, closo-$[C_2B_{10}H_{11}]^-$.
Figure 1D:
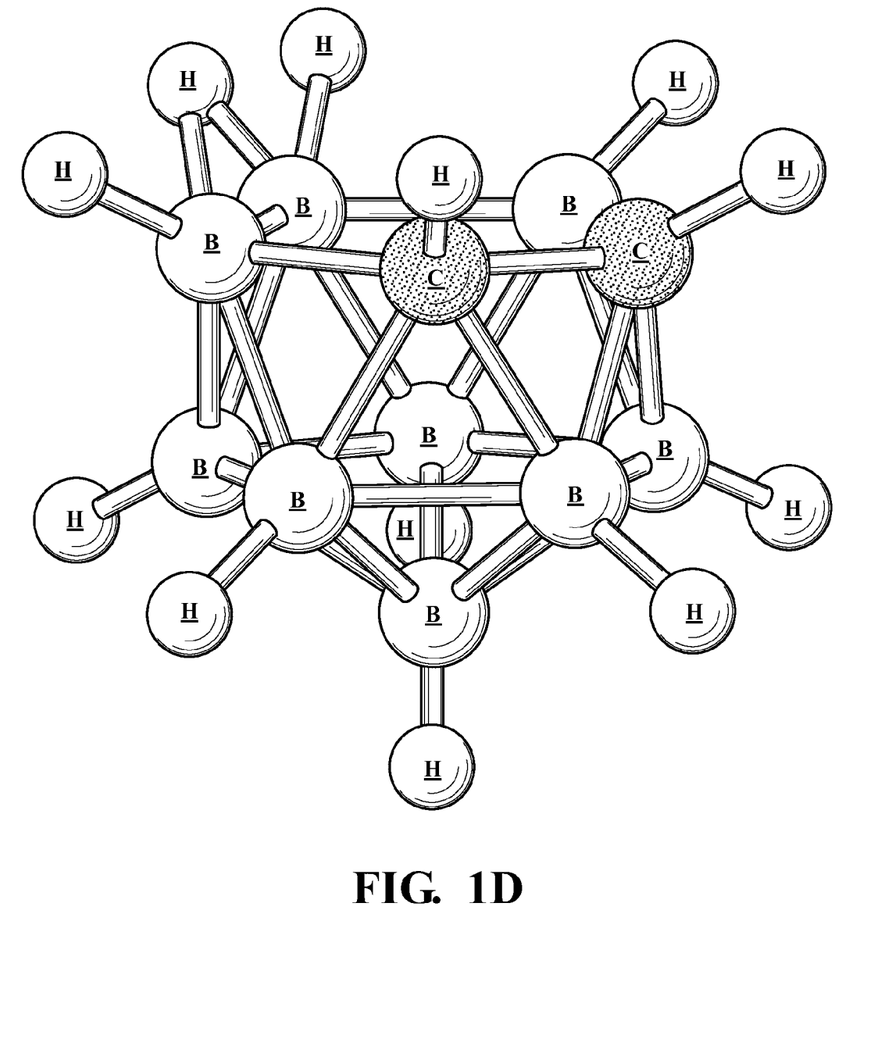
FIG. 1D is a perspective schematic view of a boron cluster anion of the present disclosure, nido-$[C_2B_9H_{12}]^-$.
Figure 1E:
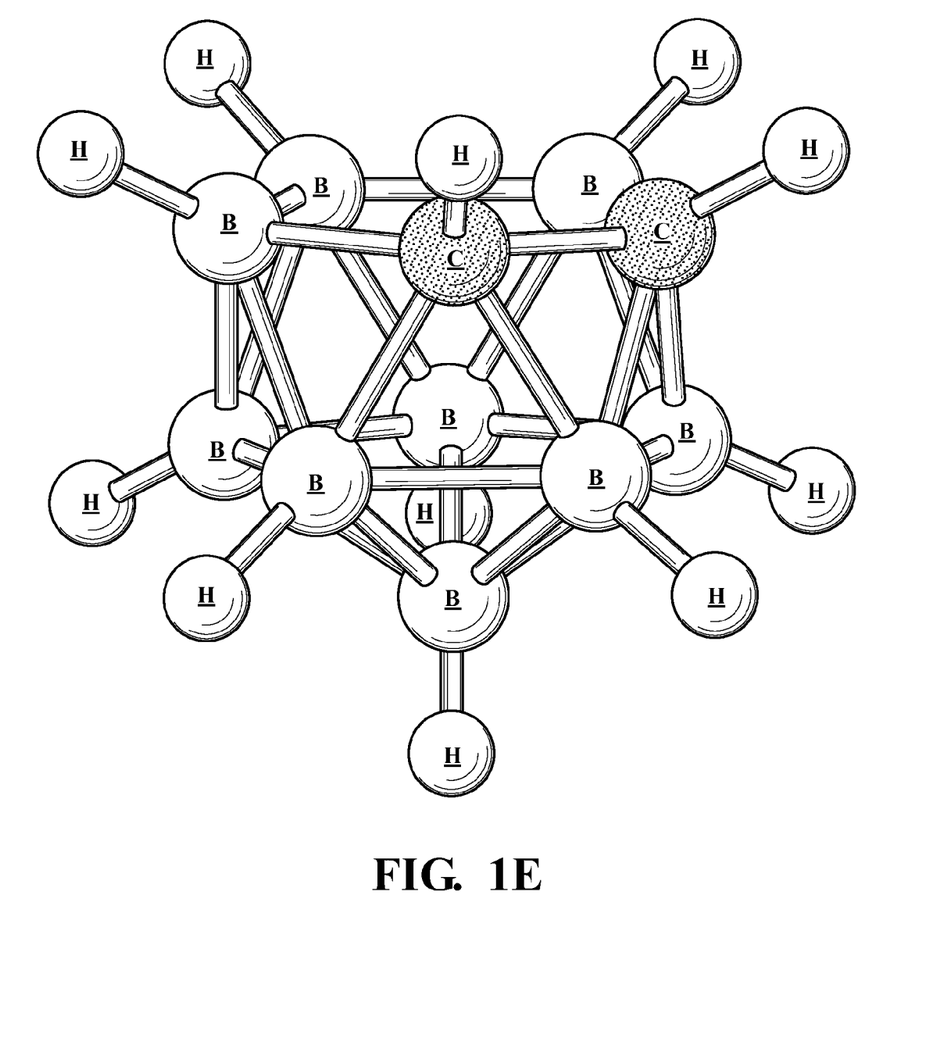
FIG. 1E is a perspective schematic view of a boron cluster anion of the present disclosure, nido-$[C_2B_9H_{11}]^{2-}$.

FIGS. 1A-1E show structures of exemplary unsubstituted boron cluster anions according to Anion Formulae I-V, respectively. Specifically, FIGS. 1A-1E show closo-$[B_{12}H_{12}]^{2-}$, closo-$[CB_{11}H_{12}]^{-}$, closo-$[C_2B_{10}H_{11}]^{-}$, nido-$[C_2B_9H_{12}]^{-}$, and nido-$[C_2B_9H_{11}]^{2-}$ respectively. The exemplary closo-$[C_2B_{10}H_{11}]^{-}$ anion of Anion Formula III is shown as a 1,2-dicarba species, however it will be appreciated that such a closo-icosahedral dicarba species can alternatively be 1,7- or 1,12-dicarba. More generally, it is to be understood that the required carbon atoms of Anion Formulae III, IV and V can occupy any possible positions in the boron cluster skeleton. Similarly it is to be understood that the required carbon atom of Anion Formula II can occupy any position in instances where positions in the boron cluster skeleton are non-equivalent (such as in a nido-boron cluster anion). It is also to be understood that non-hydrogen substituents, when present on a boron cluster anion, can be attached at any position in the boron cluster skeleton, including at vertices occupied by either boron or carbon, where applicable.

In some implementations, the ionic liquid can have a melting point lower than about 150° C. In other implementations, the ionic liquid can have a melting point lower than about 80° C. In yet other implementations, the ionic liquid can have a melting point lower than about 25° C. In some variations, the ionic liquid will have a vapor pressure lower than about 1 mPa at 25° C., in other variations the ionic liquid will have a vapor pressure lower than about 1 µPa at 25° C., and in yet other variations the ionic liquid will have a vapor pressure lower than about 1 nPa at 25° C.

The electrolyte composition also includes a magnesium salt having a magnesium cation and a second boron cluster anion, the second boron cluster anion being selectable from any of the Formulae and combinations as is the first boron cluster anion. In some implementations of the electrolyte, the second boron cluster anion can be the same as the first boron cluster anion, and in some implementations, the first and second boron cluster anions can be different.

In some variations, the magnesium salt can have a formula, $MgE_vA'_q$, where E is a solvent molecule, v is an integer within a range of 0 to 6, A' is the second boron cluster anion, and q is 1 or 2. In general, q will be one if the second boron anion has a −2 charge and q will be two if the second boron anion has a −1 charge.

The solvent molecule(s), when present, can be coordinated to the magnesium cation. Non-limiting examples of suitable solvent molecules include: monodentate ether (ethers having one ether functional group) such as diethyl ether and tetrahydrofuran and multidentate ethers (ethers having at least two ether functional groups) such as monoglyme, diglyme, triglyme, tetraglyme, polyethylene glycol dimethyl ether, and poly(ethyleneoxides); and other weakly coordinating solvent molecules such as methylene chloride.

The magnesium salt will generally be dissolved in the ionic liquid to form the electrolyte composition. In some implementations, the magnesium salt will have a solubility in the ionic liquid within a range of 0.01-5.0 M.

Additionally provided herein is an electrochemical cell comprising an electrolyte composition as described above. The electrochemical cell will generally be a magnesium battery wherein a reduction/oxidation reaction according to Reaction I occurs:

In many implementations, the electrochemical cell will be a secondary battery or a subunit of a secondary battery. In such implementations, it is to be understood that the term "anode" as used herein refers to an electrode at which magnesium oxidation occurs during cell discharge and at which magnesium reduction occurs during cell charging. Similarly, it is to be understood that the term "cathode" refers in such implementations to an electrode at which a cathode material reduction occurs during cell discharge and at which a cathode material oxidation occurs during cell charging.

The electrochemical cell has an anode, a cathode, and at least one external conductor, the external conductor being configured to enable electrical communication between the anode and the cathode. The electrochemical cell further includes an electrolyte composition, the electrolyte composition including an ionic liquid and a magnesium salt of the types described above.

The anode can comprise any material or combination of materials effective to participate in electrochemical oxidation of magnesium during a cell discharge. This can alternatively be described by saying that the anode is configured to incorporate and/or release magnesium. Similarly, the anode can comprise any material or combination of materials effective to participate in electrochemical reduction of magnesium cations and to incorporate reduced magnesium during a cell charging event. In some implementations, the anode can consist essentially of elemental magnesium (i.e. magnesium atoms having no formal charge) or comprise at least one surface layer of elemental magnesium. In other implementations, the anode can comprise an insertion-type magnesium electrode such as a tin or bismuth type anode, containing magnesium in complex or alloy with other materials to the extent the cell is charged. In variations wherein electrochemical oxidation/reduction of magnesium at the anode is reversible (e.g. in a secondary or rechargeable battery) it can be stated that the anode undergoes reversible magnesium deposition/extraction or that the anode undergoes reversible magnesium insertion/extraction.

The cathode can comprise any material or combination of materials effective to participate in electrochemical insertion of magnesium cations during a cell discharge. Similarly, the cathode can comprise any material or combination of materials effective to participate in electrochemical extraction of magnesium during a cell charging event. Suitable but non-exclusive examples of such materials can include a Chevrel phase molybdenum composition such as $Mo_6S_8$ (reversibly $MgMo_6S_8$), $FeSiO_4$ (reversibly $MgFeSiO_4$), K-$\alpha MnO_2$, MgFePO4, sulfur, organosulfur compounds, air, oxygen, or any other suitable materials.

In a simple implementation, the external conductor can be a single conductor such as wire connected at one end to the anode and at an opposite end to the cathode. In other implementations, the external conductor can include a plurality of conductors putting the anode and the cathode in electrical communication with a device configured to supply power to the electrochemical cell during a charging event, with other electrical devices situated to receive power from the electrochemical cell, or both.

In some variations, the anode of the magnesium electrochemical cell can undergo reversible magnesium deposition/extraction, or reversible magnesium insertion/extraction, with a coulombic efficiency greater than 40%.

Additionally disclosed is a method for an electrolyte composition for a magnesium electrochemical cell. The method includes a step of dissolving a magnesium salt in an ionic liquid. The magnesium salt and the ionic liquid of the method are the same in all particulars as described above with respect to the electrolyte composition.

The present invention is further illustrated with respect to the following examples. It needs to be understood that these examples are provided to illustrate specific embodiments of the present invention and should not be construed as limiting the scope of the present invention.

Example 1

Preparation of Ionic Liquid and Electrolyte Composition

An alkali or alkaline earth salt of the boron cluster is combined with two equivalents of (N,N-diethyl-N-methyl-N-(2-methoxyethyl)ammonium) halide (such as chloride, bromide or iodide), resulting in a mixture of the desired ionic liquid and an alkali or alkaline earth halide salt. This combination could be performed by direct mixing for the metathesis reaction to proceed, or by using an assisting solvent such as water, an alcohol, acetonitrile, chloroform, dichloroethane, an ether, or a mixture of two or more of these. For example, the (N,N-diethyl-N-methyl-N-(2-methoxyethyl)ammonium) halide could be dissolved in water or ethanol and mixed with the boron cluster salt. The resulting metal halide salt is removed by a suitable method, such as filtration or solvent extraction. Further purification of the ionic liquid could be conducted using methods such as crystallization at ambient temperature or at a below-ambient temperature (i.e. <25° C.). In addition, removal of any remaining moisture could be accomplished by placing the resulting product under vacuum at ambient temperature or an above-ambient temperature (preferably <250° C.) followed by further drying using azeotropic distillation methods such as those using toluene. A magnesium boron cluster salt is dissolved in the ionic liquid to the desired concentration to produce the electrolyte composition. The sample could be place under vacuum to remove any solvent molecules coordinated with magnesium cation, if desired.

Example 2

Voltammetric Analysis of Electrolyte Composition Vs. Mg/Mg$^{2+}$

Electrochemical testing is conducted in a three-electrode BASi 4 dram shell vial placed inside an MBraun glove box at 25° C. at less than 0.1 ppm $O_2$ and $H_2O$ content. Electrodes (0.02 cm$^2$ Pt working electrode, Mg ribbon counter electrode (BASi), and Mg wire reference electrode (BASi)) are polished, sonicated, and kept in a dry vacuum oven prior to each experiment. The surfaces of all magnesium electrodes are rubbed with a glass slide prior to use to remove any possible oxides. Voltammetry analysis is performed using a BioLogic potentiostat run at a scan rate of 5 mV·s$^{-1}$ and data are acquired and analyzed with EC-lab Software®.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrolyte composition for a magnesium electrochemical cell comprising:
   an ionic liquid of the formula $G_pA$, wherein:
      G is an organic cation;
      p is 1 or 2; and
      A is a first boron cluster anion; and
   a magnesium salt of the formula $MgE_vA'_q$, wherein:
      Mg is a magnesium cation;
      E is a solvent molecule coordinated to the magnesium cation;
      v is an integer within a range of 0 to 6;
      A' is a second boron cluster anion; and
      q is 1 or 2.

2. The electrolyte composition as recited in claim 1, wherein the first boron cluster anion and the second boron cluster anion each, independently, has a formula $[B_yH_{(y-z-i)}R_zX_i]^{2-}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$ or $[C_2B_{(y-3)}H_{(y-t-j-1)}R_tX_j]^{2-}$, and wherein:
   y is an integer within a range of 6 to 12;
   (z+i) is an integer within a range of 0 to y;
   (t+j) is an integer within a range of 0 to (y−1);
   X is F, Cl, Br, I, or a combination thereof; and
   R is a substituent comprising any of:
      group (i): a linear, branched-chain, or cyclic C1-C18 alkyl or fluoroalkyl group;
      group (ii): a C6-C14 aryl or fluoroaryl group;
      group (iii): a linear, branched-chain, or cyclic C1-C18 alkoxy or fluoroalkoxy group;
      group (iv): a C6-C14 aryloxy or fluoroaryloxy group; and
      group (v): a substituent that combines moieties defined by two or more of groups (i)-(iv).

3. The electrolyte composition are recited in claim 2, wherein:
   z is an integer within a range of 2 to y, or t is an integer within a range of 2 to (y−1); and
   R defines a plurality of substituents selected from groups (i)-(v).

4. The electrolyte composition as recited in claim 1, wherein the organic cation is any of imidazolium, ammonium, pyrrolidinium, piperidinium, pyridinium, sulfonium, and phosphonium, and wherein the organic cation is partially or fully functionalized with any or a combination of:
   (i) a linear or branched C1-C18 alkyl or fluoroalkyl group;
   (ii) a C6-C14 aryl or fluoroaryl group;
   (iii) an alkoxy group in which the alkyl portion is a linear or branched C1-C18 alkyl or fluoroalkyl group;
   (iv) an aryloxy group in which the aryl portion is a C6-C14 aryl or fluoroaryl group;
   (v) a substituent that combines two or more of (i)-(iv); and
   a combination thereof.

5. The electrolyte composition as recited in claim 1, wherein the solvent molecule is an ethereal molecule.

6. The electrolyte composition as recited in claim 1, wherein the first and second boron cluster anions are the same.

7. The electrolyte composition as recited in claim 1, wherein the magnesium salt comprises $Mg(CB_{11}H_{12})_2$.

8. The electrolyte composition as recited in claim 7, wherein G is at least one of ammonium and phosphonium, and the ionic liquid is present at a molar ratio relative to the magnesium salt within a range of 10:1 to 100:1, inclusive.

9. The electrolyte composition recited as claim 1, wherein the composition is in a liquid state at temperature below 100° C.

10. The electrolyte composition recited as claim 1, wherein the composition is in a liquid state at room temperature.

11. A magnesium electrochemical cell having:
an anode configured to incorporate and or release magnesium;
a cathode; and
an electrolyte composition comprising:
an ionic liquid of the formula $G_pA$, wherein:
G is an organic cation;
p is 1 or 2; and
A is a first boron cluster anion; and
a magnesium salt of the formula $MgE_yA'_q$ wherein:
Mg is a magnesium cation;
E is a solvent molecule coordinated to the magnesium cation;
y is an integer within a range of 0 to 6;
A' is a second boron cluster anion; and
q is 1 or 2.

12. The magnesium electrochemical cell as recited in claim 11, wherein the first boron cluster anion and the second boron cluster anion each, independently, has a formula $[B_yH_{(y-z-i)}R_zX_i]^{2-}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$ or $[C_2B_{(y-3)}H_{(y-t-j-1)}R_tX_j]^{2-}$, and wherein:
y is an integer within a range of 6 to 12;
(z+i) is an integer within a range of 0 to y;
(t+j) is an integer within a range of 0 to (y−1);
X is F, Cl, Br, I, or a combination thereof; and
R is a substituent comprising any of:
group (i): a linear, branched-chain, or cyclic C1-C18 alkyl or fluoroalkyl group;
group (ii): a C6-C14 aryl or fluoroaryl group;
group (iii): a linear, branched-chain, or cyclic C1-C18 alkoxy or fluoroalkoxy group;
group (iv): a C6-C14 aryloxy or fluoroaryloxy group; and
group (v): a substituent that combines moieties defined by two or more of groups (i)-(iv).

13. The magnesium electrochemical cell as recited in claim 12, wherein z is an integer within a range of 2 to y or t is an integer within a range of 2 to (y−1); and R defines a plurality of substituents, the plurality of substituents comprising a plurality of groups (i)-(v).

14. The magnesium electrochemical cell recited in claim 11, wherein the cell is a rechargeable battery system.

15. The magnesium electrochemical cell as recited in claim 11, wherein the electrolyte composition is substantially compatible with the anode, as defined by reversible magnesium deposition/extraction with coulombic efficiency greater than 40%.

16. The magnesium electrochemical cell is recited in claim 11, wherein the anode is a magnesium metal anode and allows reversible magnesium deposition/stripping.

17. The magnesium electrochemical cell as recited in claim 11, wherein the anode is a magnesium metal anode and allows reversible magnesium insertion/extraction.

18. The magnesium electrochemical cell as recited in claim 11, wherein the anode is an insertion-type anode.

* * * * *

UNITED STATES PATENT AND TRADEMARK OFFICE
CERTIFICATE OF CORRECTION

PATENT NO. : 9,455,473 B1
APPLICATION NO. : 14/883556
DATED : September 27, 2016
INVENTOR(S) : Mohtadi et al.

It is certified that error appears in the above-identified patent and that said Letters Patent is hereby corrected as shown below:

In the Specification

Column 4, Line 36, "Anion Formulae I-IV" should be -- Anion Formulae I-V --

In the Claims

Column 8, Line 35, "composition are recited in" should be -- composition as recited in --

Column 8, Line 65, "composition recited as claim" should be -- composition as recited in claim --

Column 9, Line 1, "composition recited as claim" should be -- composition as recited in claim --

Column 10, Line 16 (approx.), "cell recited in" should be -- cell as recited in --

Column 10, Line 23 (approx.), "cell is recited in" should be -- cell as recited in --

Signed and Sealed this
Second Day of October, 2018

Andrei Iancu
*Director of the United States Patent and Trademark Office*